(12) United States Patent
Thangam et al.

(10) Patent No.: US 8,666,164 B2
(45) Date of Patent: Mar. 4, 2014

(54) SYSTEM AND METHOD FOR MODELING A REGION SEGMENTED IMAGE

(75) Inventors: Sivaram Vargheese Thangam, Kanyakumari District (IN); Krishnamurthy Sai Deepak, Bilaspur District (IN); Harikrishna Gandhinagara Narayana Rai, Bangalore (IN); Pranav Prabhakar Mirajkar, Nasik (IN)

(73) Assignee: Infosys Limited, Bangalore (IN)

( * ) Notice: Subject to any disclaimer, the term of this patent is extended or adjusted under 35 U.S.C. 154(b) by 75 days.

(21) Appl. No.: 13/357,571

(22) Filed: Jan. 24, 2012

(65) Prior Publication Data

US 2013/0022267 A1 Jan. 24, 2013

(30) Foreign Application Priority Data

Jul. 19, 2011 (IN) ............................ 2446/CHE/2011

(51) Int. Cl.
*G06K 9/34* (2006.01)
(52) U.S. Cl.
USPC ............................ 382/173; 382/171; 382/203
(58) Field of Classification Search
USPC ................. 382/169, 171, 173, 164, 178, 203; 359/237, 290, 291; 358/3.26, 1.14; 250/493.22; 345/153, 177; 349/5, 57, 349/66, 122; 347/9, 91
See application file for complete search history.

(56) References Cited

U.S. PATENT DOCUMENTS 6,282,317 B1 * 8/2001 Luo et al. ...................... 382/203

* cited by examiner

*Primary Examiner* — Anh Do
(74) *Attorney, Agent, or Firm* — Marc S. Kaufman; Stephen M. Hertzler; Reed Smith LLP

(57) ABSTRACT

A system and method for modeling a region segmented image is described. Aspects of the present invention may include the generation of a computer model that models the region segmented image, the computer model comprising one or more nodes, wherein each node in the one or more nodes represents an arbitrarily shaped region present in the region segmented image, and each of the arbitrarily shaped regions comprises an image segment wherein the image segment is an indivisible partition in the region segmented image. The model may additionally comprise one or more logical nodes, wherein each logical node represents an image region formed by the union of two or more arbitrarily shaped image regions in the region segmented image that exhibit at least one type of spatial relationship and a hierarchical graph representation of the region segmented image. Types of spatial relationships may include hierarchical, adjacent and cohesive spatial relationships.

31 Claims, 6 Drawing Sheets

SYSTEM AND METHOD FOR MODELING A REGION SEGMENTED IMAGE

RELATED APPLICATION DATA

This application claims priority to Indian Patent Application No. 2446/CHE/2011, filed Jul. 19, 2011, which is hereby incorporated by reference in its entirety.

FIELD OF THE INVENTION

The invention relates generally to image segmentation and techniques for modeling a segmented image. In particular, the invention relates to the generation of a computer model for an image segmented by region.

BACKGROUND

Image segmentation, as a technique in the representation of images, is well-known in the fields of computer vision, solid modeling, and image processing and computer graphics. In general, images might have several regions of interests and these image regions can be segmented based on image properties like color, texture, gray level and shape. Once these image regions are segmented, they may be modeled in a structure that can be handled by a suitable region processing algorithm. In general, the model thus used ought to preserve all spatial relationships among image regions and should be compact enough for in-memory representation and accessibility.

Several techniques have been employed for creating such an image representation for region-segmented images. Prominent techniques include a Region Adjacency graph representation method and a Region Adjacency tree representation method. However, the Region Adjacency Graph method for modeling image regions and spatial relationships is oriented towards coding an adjacency (neighborhood) relationship among image regions and fails to capture a containment relationship among them, which increases complexity. When modeled for complex images with a large number of image regions, the graph becomes unwieldy as all adjacency relationships among the image regions are added to it. As the efficiency of the processing algorithms that work on the image model is directly dependent on the accessibility of the image regions, a typical image representation should be compact enough for processing algorithms to efficiently work on. On the other hand, the Region Adjacency Tree, which is a hierarchical representation of image regions, captures a containment relationship among the image regions, but misses the adjacency relationship among them, resulting in loss of granularity.

In general, hierarchical models are attractive as they are simple to implement. Some popular hierarchical models include the Quad tree model, and the Horizontal Vertical ('HV') Binary tree model. In the Quad tree model, the image is recursively partitioned into 4 equal regions and these regions form the nodes of the tree. The root node of the Quad tree represents the whole image and the other nodes represent the partitions of the image with the leaf nodes representing the individual small partitions. A HV tree is similar to the Quad tree except in that each node in it can have only two child nodes, and the partition of the nodes alternates between horizontal and vertical bisections of the region. However, representations like the Quad tree and the HV tree are limited in that they cannot represent arbitrary shaped regions in the image, only rectangular partitions of the image.

Another kind of technique for modeling images is based on establishing semantic relationship among image regions, and ignoring the spatial relationship among them. Semantic relationships generally characterize the similarity of image region properties like texture, color or shape. These techniques establish a relationship among image regions based on the similarity of the semantic properties of the image regions, ignoring the spatial relationship among them, which serves to make them generally unsuitable for purposes other than semantic image retrieval. Additionally, image understanding, which is a vital component of semantic image retrieval, cannot be addressed using solely semantics-based image representations. Therefore, hybrid techniques which attempt to characterize both the topology and geometry of the image in a representation model have been developed. These mostly use multiple data structures, however, and lack compactness in their representation. In general, representing images in the form of a graph or tree is commonly preferred as the nodes in them are very easily accessible through the links connecting them.

Most existing techniques are fundamentally limited in that they are purpose designed, i.e. they are built and optimized solely for a specified range of uses, and unsuited or inefficient for applications that are directed otherwise. For example, most hierarchical-only models like the Quad or HV tree have simple and robust image segmentation mechanisms, and, therefore, this general category of representations is used for purposes like segmenting images, but as they lack the ability to model, for example, arbitrarily shaped image regions, they are generally not used for modeling images that possess such characteristics. In general, image representations generated from segmenting images by a specific algorithm are particular to it, and cannot be used for other purposes.

Accordingly, there is a need for a well-designed image representation for generic use. Such a representation may require modeling both image regions and their spatial relationships and representing them in a well-organized, compact structure which has a proven accessibility and robustness.

SUMMARY OF THE INVENTION

A system for modeling a region segmented image is described. The system comprises a processor readable storage medium and a computer model that models the region segmented image, the computer model is stored as a data structure on the storage medium and is capable of being accessed and read by a computer program, and comprises one or more nodes, wherein each node in the one or more nodes represents an arbitrarily shaped region present in the region segmented image, and each of the arbitrarily shaped regions comprises an image segment wherein the image segment is an indivisible partition in the region segmented image. The model additionally comprises one or more logical nodes, wherein each logical node represents an image region formed by the union of two or more arbitrarily shaped image regions in the region segmented image that exhibit at least one type of spatial relationship selected from a hierarchical spatial relationship and an adjacent spatial relationship, and, finally, a hierarchical graph representation of the region segmented image, the hierarchical graph representation comprising each of the one or more nodes and each of the one or more logical nodes, wherein each of the one or more nodes and each of the one or more logical nodes is a vertex in the hierarchical graph, and the characteristic spatial relationship between each of the one or more nodes and connecting nodes form connecting edges between vertices.

In an additional embodiment of the invention, a computer implemented method of generating a model for a region segmented image is described. The method comprises selecting an image region from the region segmented image, determining if the image region selected constitutes a hierarchical region, an adjacent region or an image segment and establishing a spatial relationship between the image region selected and other image regions in the region segmented image. Establishing a spatial relationship between the image region selected and other image regions in the segmented image may further comprise parsing a selected hierarchical region row-wise until a background segment in the hierarchical region is determined, parsing a selected adjacent region row-wise and determining the boundaries of the two or more image regions that belong to the adjacent region thereby, and forming a cohesive region. The cohesive region is a subset of the adjacent region selected and an image region that belongs to the adjacent region is added to the cohesive region if the image region is adjacent to all image regions that belong to the adjacent region, and is not, additionally, a part of an existing cohesive region.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

Figure 1:
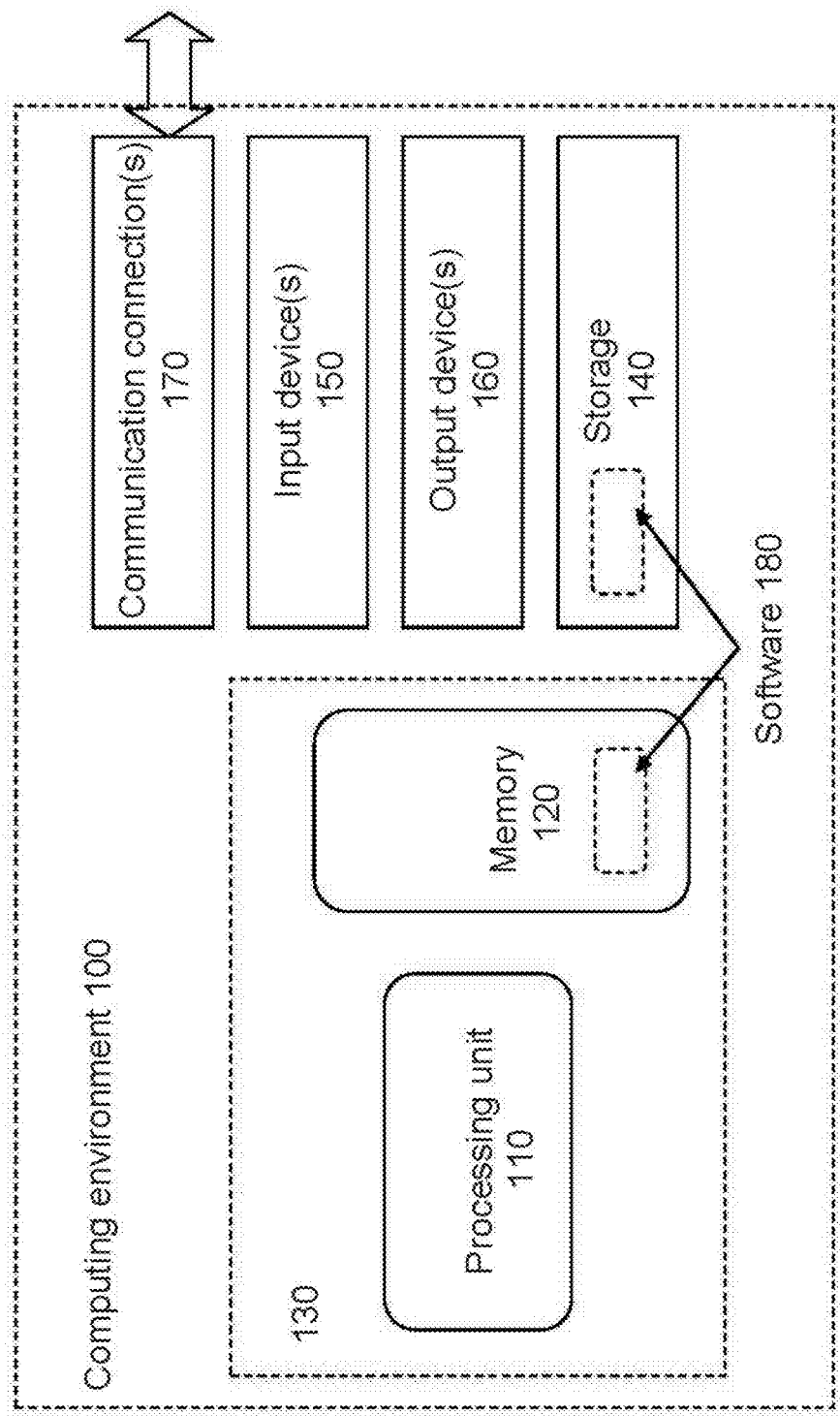
FIG. 1 is a computer architecture diagram illustrating a computing system capable of implementing the embodiments presented herein.

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

The present invention relates to the modeling of region-segmented images. One or more arbitrary shaped image regions in a region-segmented image may be modeled in accordance with an embodiment and the spatial relationships that exist among them preserved thereby. Individual regions and the arbitrary shaped image regions formed by the union of individual image regions which possess certain spatial relationships may also constitute part of a model generated.

Image regions may be grouped as individual segments, or nodes, and logical image regions, or logical nodes. More specifically, a region is a finite set of segments where every segment is either directly or transitively connected to all the segments of the same set. A segment, then, is a set of connected pixels, or a set comprising one or more of the smallest distinguishable and resolvable elements of an image that are connected, in an image which possess similar characteristics under specific criterion. Two such image elements are said to be connected if a defined neighborhood of each of the image elements contains the other. Two segments are said to be transitively connected if there exist a set of pixels, or basic image elements, which connect the two segments under certain criterion. In general, a segment cannot be further divided into further segments for the same set of criterion.

Spatial relationships characterize the association of image regions wherein two segments are connected to each other if at least one pixel, or basic image element, in one segment has a spatial neighborhood in other segment. A spatial relationship among two segments may also include a containment relationship wherein a segment is contained in another segment if they are connected and all the boundary points in the contained segment has its neighborhood in the containing segment.

In a described implementation, logical image regions are further classified as a hierarchical region, or an adjacent region or a cohesive region, which are hereinafter referred to as a 'Hiegion', an 'Adjion' and a 'Cohgion' respectively. A Hiegion, then, is a logical image region formed out of combining two or more image segments, where a single image segment is in a containment relationship with all other segments. A segment $S_i$ is said to be contained in another segment $S_j$ if $S_i$ and $S_j$ are connected and all the outermost boundary points in the contained segment $S_i$, has its neighbors in both $S_i$ and Sj. The segment containing all other segments that belong to the particular Hiegion, then, is called a background segment of that Hiegion. A Hiegion can also contain another Hiegion, an Adjion or a Cohgion.

An Adjion is a logical image region formed by combining two or more segments in which each segment is either directly or transitively connected to all other segments and none of them are contained in others belonging to the set. An Adjion may contain a Hiegion.

A Cohgion is a logical image region formed out of two or more image segments in which each segment is connected to all other segments belong to it. A Cohgion is always a subset of an Adjion. Representing multiple segments, background segments, Hiegions, Adjions and Cohgions as vertices, and the spatial relationship that exist among these image regions as edges connecting these vertices forms a hierarchical directed acyclic graph, in accordance with an embodiment described.

Referring now to FIG. 1, a computing environment 100 comprising a processing unit 110, a communication connection 170, an input device 150, an output device 160, and a processor readable storage medium 140, in operable communication with the processing unit 110, is depicted. The computing environment runs a software 180, the software 180 stored on the computer readable storage medium, and consisting of one or more programming instructions stored in the processor readable storage medium, the programming instructions suitable for modeling a region segmented image.

Figure 2:
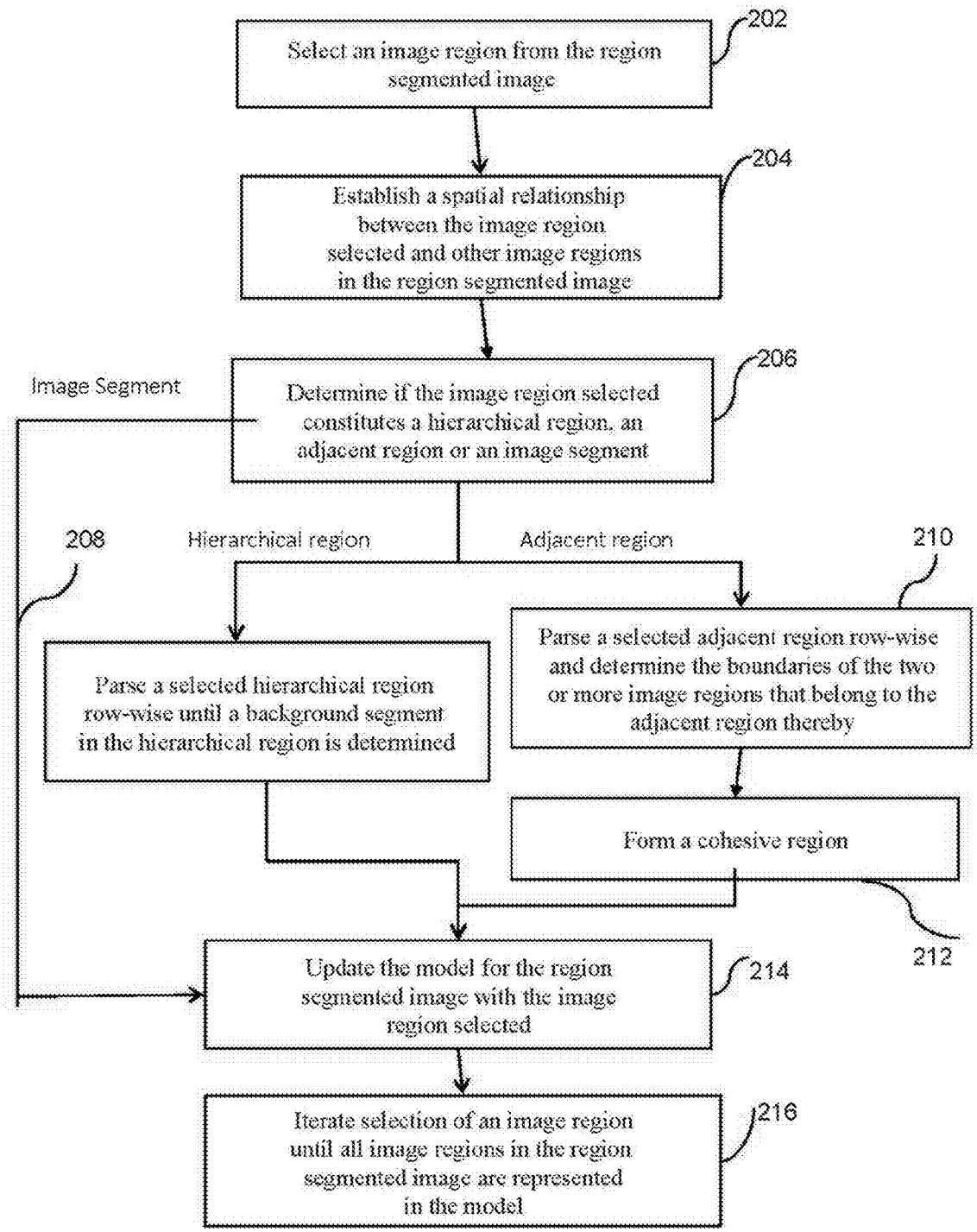
FIG. 2 is a flow diagram illustrating a method of generating a model of a region segmented image.

The generation of a model in the computing environment described by FIG. 1, where the model represents a region segmented image, is now described with reference to FIG. 2. As in a step 202, an image region from the region segmented image is first selected. Initially, the whole image may be considered an image region and added to the model. Then, the spatial classification of the selected region is established, as in a step 204, i.e. whether the selected region is a Hiegion, an Adjion, or a segment or a background segment, is established.

As in a step 206, determining if the given image region comprises the step of traversing through boundary image elements in the image region and ascertaining whether all associated pixel, or basic image element, attributes of the boundary elements are the same. If they are not, the selected region is an Adjion. If they are, the selected region is a Hiegion, or an image segment, or a background segment. In order to ascertain whether the region is one of the latter, all the pixel, or basic image element, attributes in the image region are traversed. If all traversed image attributes are the same, then the selected region is a segment. If they are not, the image region could be a Hiegion, or a background segment. If there is then an ignorable image element found within the region, it is classified as a background segment, or, otherwise, as a Hiegion. If the region identified is a segment or background segment, it will be directly added to the model, as in a step 216. If not, it is parsed for further regions.

Parsing a selected Hiegion, as in a step 208, comprises the step of marking a boundary element of the selected image region as a background pixel, or background image element, and traversing the image region to find a pixel value different from the said background pixel. Once found, that image element represents a boundary of a new region contained within the particular Hiegion. The boundary of the new region is then traced from the image element and the boundary of the new region captured thereby. Once the boundary is captured, the newly found region will be filled with ignorable pixels to preclude it from further scans. Continuing the scan in the same way throughout the image region parses the given Hiegion and finds all regions contained within it. The image region that remains after extracting all the regions contained within the Hiegion constitutes the background of that particular Hiegion.

If the selected image region is identified as an Adjion, then it is parsed, as in a step 210. Parsing an Adjgion starts by selecting one element from the boundary of the Adjgion, and tracing that particular region's boundary where all the region boundary elements have similar properties, i.e. the elements belong to the same segment. This set of boundary elements and the basic image elements, or pixels, which belong within the traced region, mark a region of the Adjgion. During the trace, all boundary elements that are identified as belonging to, or also belonging to, neighboring regions are added so that new regions that belong to this Adjgion may be traced. Thus all regions similarly formed by tracing the Adjgion form regions that belong to the Adjgion A Cohgion may then be formed, in accordance with a step 212. Forming a Cohgion is a step that is performed once an Adjgion is parsed. Cohgions are elements of an Adjgion, which are sets of regions that are all connected to each other. Once an Adjgion is formed, sets of regions are formed where, in each set, all regions that belong to the set are connected to each other. Each of these sets form Cohgions in an Adjgion The model is then updated with the image region selected, as in a step 214. The region added could be a hierarchical region, an adjacent region, a coherent region or an image segment, or a background segment, as previously described. Then, this selection process is iterated until all regions in the image are represented in the model, as in a step 216.

Figure 3:
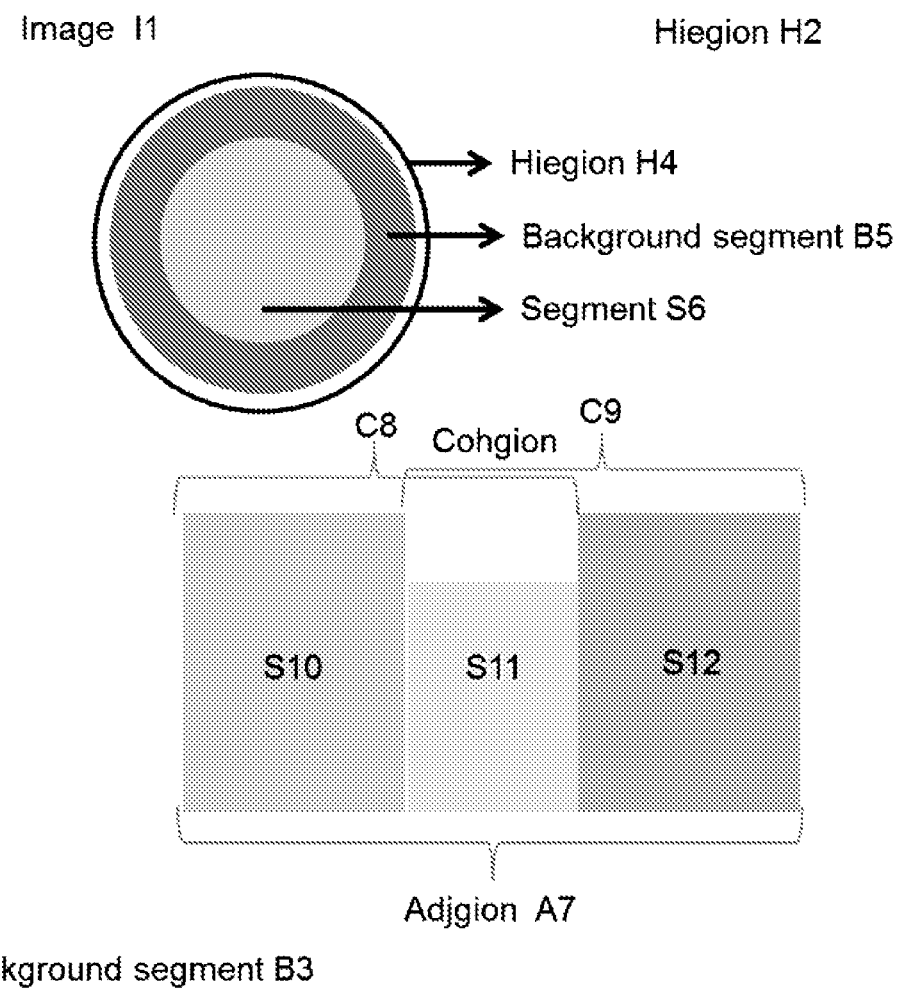
FIG. 3 is a synthetic image with regions annotated in accordance with an implementation.
Figure 4:
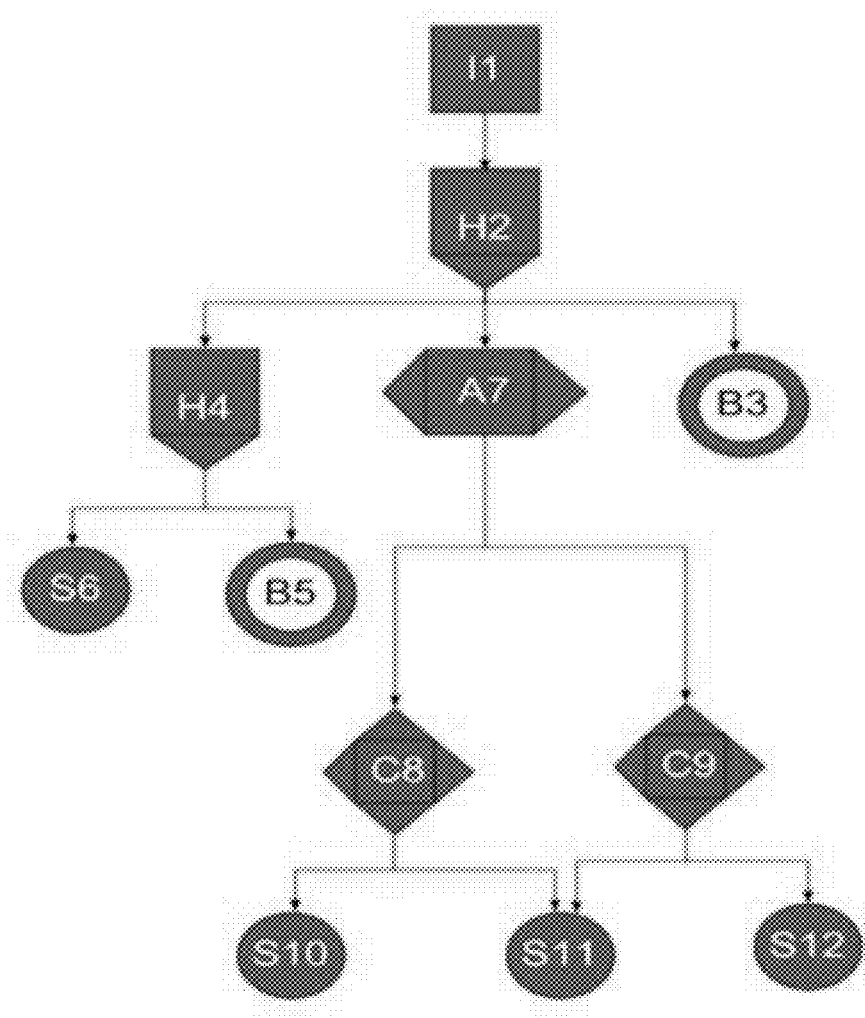
FIG. 4 is an illustration of a model of the synthetic image depicted in FIG. 3, in accordance with an implementation.

An example implementation is additionally described with reference to FIG. 3. FIG. 3 is a synthetic image consisting of an image I1. A generated model that is constructed from the image is captured in FIG. 4. Firstly, the input image region is identified. In this case, the first input image region would be I1, and I1 is thus inserted as a topmost level node, as depicted in FIG. 4. Then the boundary pixels of the region are examined. In this case, the boundary pixels of the image region have the same attributes. Therefore, all pixels of the image region are traversed. In the region I1, the pixels traversed thereby do not all share similar attributes. Therefore, the image region is examined for ignorable pixels. In this case, since this is the first pass, no ignorable pixels are found. Therefore, the region is marked as a hierarchical region, H2.

In accordance with a described implementation of the invention, H2, as a hierarchical region, is now parsed for successive image regions. Firstly, a boundary pixel is marked as belonging to a background segment, B3. Then the pixels in the image region are traced row wise. If, on examination of one or more attributes associated with the pixel, or image element, it is determined that a successively traced pixel belongs to a new region, then the boundary of that region is traced and marked, and the region added to the list of regions. The new region is then filled with ignorable values, in order to prevent redundant traces. In H2 of FIG. 4, this operation yields two distinct image regions, and the background segment, B3. Specifically, if, when a successively traced pixel is determined as belonging to an existing region, it is checked if there remain any further pixels that remain for parsing. If there are not, then the background segment determined is traced and added to the list of regions that belong to the hiegion H2, and the hierarchical representation updated with the background segment B3 and the two other, newly identified, regions.

A similarly iterative procedure is followed with respect to the two new regions identified. In this way, it may be determined that new region designated H4 is also a hierarchical region, which on parsing yields a segment S6 and a background segment B5.

In FIG. 3, it is then determined that a traversal of the boundary of the region marked A7 does yield the condition wherein all boundary pixels share the same attributes. Therefore, A7 is marked as an Adjion, and further parsed. Like the first level traversal, all pixels in the input region A7 are then traced row wise. If a pixel is similarly discovered to belong to a new region, then the boundary of that region is traced and marked, and the new region added to the list of image regions that belong to the Adjion. If no further pixels are identified as belonging to a new region, and none remain for parsing, the list of regions that belong to the Adjion is updated.

Once the regions that belong to the Adjion are identified, Cohgions are marked. This may be done by, firstly, creating an adjacency matrix for each of the regions in the Adjion, traversing the matrix row wise and selecting 2 related regions therein. Then it is examined whether any further regions remain in the matrix. In FIG. 3, as there are 3 newly identified segments that belong to the Adjion, at least two passes of regions in the matrix are required. Therefore, it is checked whether each of the two regions belong to an existing Cohgion. If not, then a Cohgion comprising the two new regions is created. In this case, with reference to FIG. 3, region C8 is marked as a Cohgion. Then a new list of regions contained in the Adjion that excludes the above regions is created and added to the list of regions in the Adjion. If there then remain regions in the Adjion that do not belong to the Cohgion, then the next such region is selected. If the new region is adjacent to all the regions belonging to the new Cohgion, in this case C8, then the new region is added to the current Cohgion and region removed from the list of regions belonging to the Adjion that remain.

If there then remain further regions in the Adjion that do not belong to the Cohgion created, as there would in FIG. 3 where S12 is not adjacent to the identified region S10, then a next set of 2 related regions from the adjacency matrix is selected and the process repeated. Once all regions in the adjacency matrix are marked as belonging to one or more Cohgions, the list of Cohgions are marked and the overall hierarchical representation updated accordingly. This process followed iteratively, then, results in the identification of two Cohgions, C8 and C9, as belonging to the Adjgion A7.

For each of the regions that belong to a Cohgion, Adjion or Hiegion, if, on traversal of all pixels in the region, it is discovered that the pixels share the same attributes, then the region is marked as a segment, and the hierarchical representation updated accordingly. No further parsing may be performed in such an instance.

Figure 5:
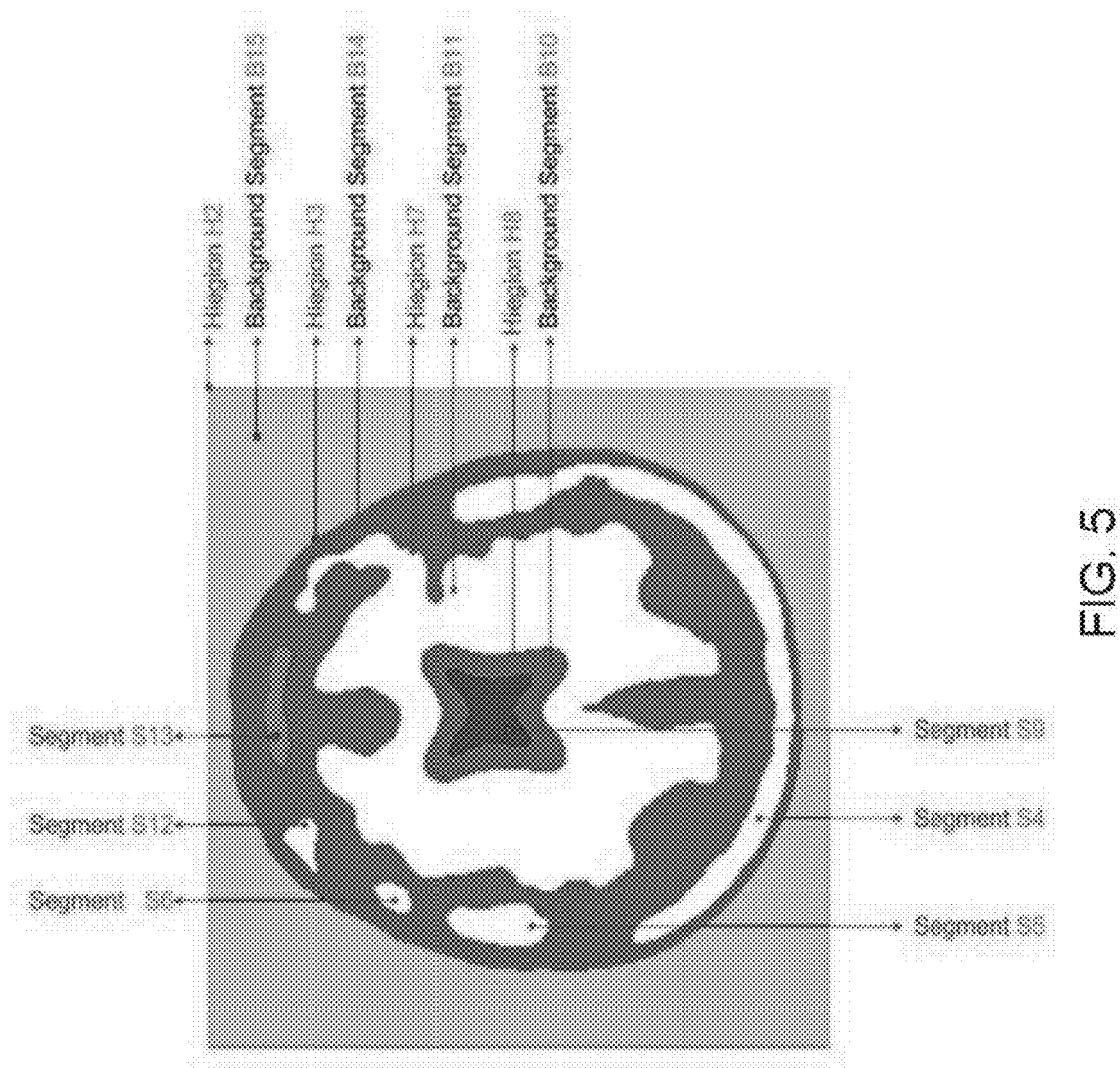
FIG. 5 is a region segmented medical image with regions annotated in accordance with an implementation.
Figure 6:
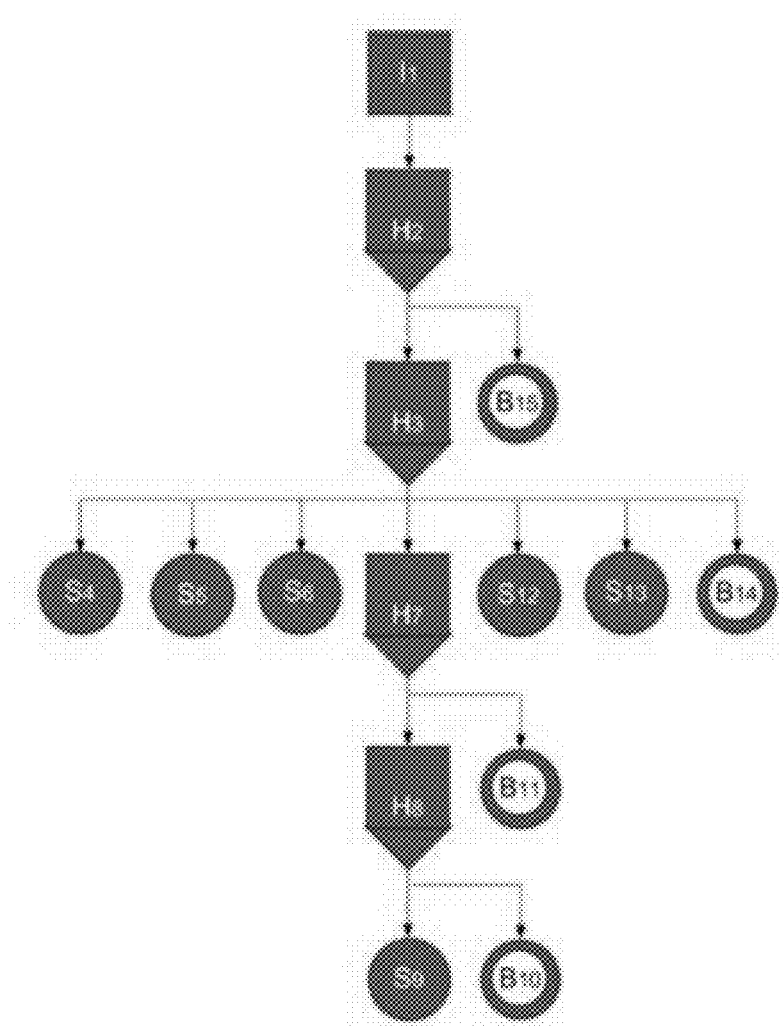
FIG. 6 is an illustration of a model of the region segmented image of FIG. 5, in accordance with an implementation.

Similarly, traversing FIG. 5 which is a region segmented medical image, or, more specifically, a CT scan of a brain, in accordance with the implementation described, will yield the hierarchical representation of the CT scan that is depicted in FIG. 6.

Aspects of the proposed invention, then, serve several purposes in image retrieval scenarios. In region based CBIR (Content based Image Retrieval), it can be used for representing images when indexing offline and representing a queried image when querying the system online. Apart from enabling region-based image search, combining spatially related regions in the query image and searching for similar image regions may be supported.

The categorization of image regions in the model reduces search space tremendously while retrieving image regions from the system. For example, if the user combines a region with its contained region, thereby forming a new region and issues a query, the model may classify this combined region as a Hiegion and perform a search solely on Hiegions in the system. This reduces the time needed for retrieving similar image regions and thus enables faster retrieval.

In region based image retrieval systems that support semantic retrieval, this model may be very helpful for answering semantic queries. Making a semantic meaning out of an image is analogous to making a meaning out of a text sentence. Words are analogous to individual image regions and the logical regions are analogous to phrases and making semantics out of the image is achieved through the established spatial relationships. Since the model depicts the topology of the image, the model itself may be used as a feature for comparison and, therefore, finding similarity of the images becomes equivalent to graph matching. The proposed model also facilitates removal and merging of image regions.

Aspects of the present invention may also be used in object recognition. In general, the differing characteristics of the regions surrounding an object are crucial elements in recognizing the object. The proposed image model enables this through the modeled spatial relationship an image region has with other surrounding regions. Object tracking and surveillance in videos is another area of application of this image model. Object in the first frame of the video are identified and then tracked in subsequent frames by modeling the video frames. As the model may depict the layout of an image, any new object or change in the existing layout may be found from the model.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A system for modeling a region segmented image, the system comprising:
   a processor readable storage medium in operable communication with a processor, the processor readable storage medium containing one or more programming instructions;
   a computer model that models the region segmented image, the computer model stored as a data structure on the processor readable storage medium, the computer model capable of being accessed and read by a computer program and comprising:
   one or more nodes, wherein:
   each node in the one or more nodes represents an arbitrarily shaped region present in the region segmented image; and
   each of the arbitrarily shaped regions comprise an image segment, wherein the image segment is an indivisible partition in the region segmented image;
   one or more logical nodes, wherein each logical node represents an image region formed by the union of two or more arbitrarily shaped image regions in the region segmented image that exhibit at least one type of spatial relationship selected from a hierarchical spatial relationship and an adjacent spatial relationship; and
   a hierarchical graph representation of the region segmented image, the hierarchical graph representation comprising each of the one or more nodes and each of the one or more logical nodes, wherein each of the one or more nodes and each of the one or more logical nodes is a vertex in the hierarchical graph, and the characteristic spatial relationship between each of the one or more nodes and connecting nodes form connecting edges between vertices.

2. The system as claimed in claim 1, wherein the hierarchical graph representation is directed and acyclical.

3. The system as claimed in claim 1, wherein a logical node belongs to a hierarchical region, the hierarchical region formed by the union of two or more arbitrarily shaped image regions that exhibit a containment relationship wherein at most one of the two or more arbitrarily shaped image regions contains each of the other image regions and the image area covered by this region and not covered by any of the two or more arbitrarily shaped image regions it contains is designated as a background segment.

4. The system as claimed in claim 3, wherein a logical node belongs to an adjacent region and the adjacent region is formed by the union of two or more arbitrarily shaped image regions wherein each of the two or more arbitrarily shaped image regions in the adjacent region is directly or transitively connected to the other image regions in the adjacent region and none of the arbitrarily shaped image regions in the adjacent region are in a containment relationship with each other.

5. The system as claimed in claim 4, wherein a logical node belongs to a cohesive region and the cohesive region is formed by a union of two or more arbitrarily shaped image regions wherein each of the two or more arbitrarily shaped image regions are directly connected to each other and none are in a containment relationship with each other.

6. The system as claimed in claim 5, wherein each logical node that belongs to a hierarchical region has a single parent vertex.

7. The system as claimed in claim 5, wherein each logical node that belongs to an adjacent region has a single parent vertex.

8. The system as claimed in claim 5, wherein each logical node that belongs to a cohesive region has at least two parent vertices.

9. The system as claimed in claim 5, wherein one or more nodes are represented in one or more leaf nodes of the hierarchical graph and one or more logical nodes, comprising one or more hierarchical regions, one or more adjacent regions and one or more cohesive regions, are represented in one or more non-leaf nodes of the hierarchical graph.

10. The system as claimed in claim 9, wherein the nodes and logical nodes comprise image attributes and boundary information from the respective image regions they represent.

11. The system as claimed in claim 9, wherein vertices at the highest level in the hierarchical graph representation of the region segmented image represent the entire region segmented image and vertices at the lowest level represent image segments in the region segmented image.

12. The system as claimed in claim 9, wherein information relating to an image attribute in an image region is stored in one or more vertices that represent the image region, whereby retrieval of said information is enabled by means of traversing the hierarchical graph representation in the computer model.

13. The system of claim 12, further comprising locating an image region which corresponds to a vertex in the computer model, wherein locating said information is enabled by means of traversing the hierarchical graph representation in the computer model.

14. The system of claim 12, further comprising searching an image region which corresponds to a vertex in the computer model.

15. The system of claim 12, further comprising deriving a spatial relationship between the modeled image regions.

16. The system of claim 15, further comprising establishing semantic queries in the image through the modeled spatial relationship between the image regions.

17. The system of claim 9, further comprising generating a computer model for the region segmented image, the generation of the computer model for the region segmented image comprising:
performing a selection of an image region from the region segmented image;
determining if the image region selected constitutes a hierarchical region, an adjacent region or an image segment;
parsing a selected hierarchical region row-wise until the background segment in the hierarchical region is determined;
parsing a selected adjacent region row-wise and determining the boundaries of the two or more image regions that belong to the adjacent region thereby;
forming a cohesive region, wherein the cohesive region is a subset of the adjacent region selected and an image region that belongs to the adjacent region is added to the cohesive region if the image region is adjacent to all image regions that belong to the adjacent region; and
establishing a spatial relationship between each of the image regions in the region segmented image thereby.

18. The system of claim 17, wherein the boundary of each image region is traced according to a difference between values of an image attribute associated with the image region and all image regions adjacent to it.

19. A computer implemented method executed by one or more computing devices for generating a model for a region segmented image, the method comprising:
selecting, by at least one of the one or more computing devices, an image region from the region segmented image; and
establishing, by at least one of the one or more computing devices, a spatial relationship between the image region selected and other image regions in the region segmented image, further comprising:
determining if the image region selected constitutes a hierarchical region, or an adjacent region;
parsing the selected region row-wise until a background segment in the region is found if the image region selected is determined to be a hierarchical region; and
parsing the selected image region row-wise and determining the boundaries of the two or more image regions that belong to the image region thereby, if the image region selected is determined to be an adjacent region, said parsing further comprising:
forming a cohesive region, wherein the cohesive region is a subset of the adjacent region selected and an image region that belongs to the adjacent region is added to the cohesive region if the image region is adjacent to all image regions that belong to the adjacent region and is not a part of an existing cohesive region;
updating the model with the selected image region if the image region is an image segment, wherein an image segment is an indivisible partition in the region segmented image; and
iterating the selection of an image region until all image regions in the region segmented image are represented in the model.

20. The method as claimed in claim 19, wherein determining further comprises tracing the boundary of the image region selected.

21. The method as claimed in claim 20, wherein the boundary of each image region is traced according to a difference between values of an image attribute associated with the image region and all image regions adjacent to it.

22. The method as claimed in claim 19, wherein the model comprises:
   one or more nodes, wherein:
      each node in the one or more nodes represents an arbitrarily shaped region present in the region segmented image; and
      each of the arbitrarily shaped regions comprise an image segment;
   one or more logical nodes, wherein each logical node represents an image region formed by the union of two or more arbitrarily shaped image regions in the region segmented image that exhibit at least one type of spatial relationship selected from a hierarchical spatial relationship and an adjacent spatial relationship; and
   a hierarchical graph representation of the region segmented image, the hierarchical graph representation comprising each of the one or more nodes and each of the one or more logical nodes, wherein each of the one or more nodes and each of the one or more logical nodes is a vertex in the hierarchical graph, and the characteristic spatial relationship between each of the one or more nodes and connecting nodes form connecting edges between vertices whereby the hierarchical graph representation is directed and acyclical.

23. The method as claimed in claim 22, wherein each logical node that belongs to a hierarchical region has a single parent vertex.

24. The method as claimed in claim 22, wherein each logical node that belongs to an adjacent region has a single parent vertex.

25. The method as claimed in claim 22, wherein each logical node that belongs to a cohesive region has at least two parent vertices.

26. The method as claimed in claim 22, wherein one or more nodes are represented in one or more leaf nodes of the hierarchical graph and one or more logical nodes, comprising one or more hierarchical regions, one or more adjacent regions and one or more cohesive regions, are represented in one or more non-leaf nodes of the hierarchical graph.

27. The method as claimed in claim 22, wherein the nodes and logical nodes comprise image attributes and boundary information from the respective image regions they represent.

28. The method as claimed in claim 22, wherein vertices at the highest level in the hierarchical graph representation of the region segmented image represent the entire region segmented image and vertices at the lowest level represent image segments in the region segmented image.

29. The method as claimed in claim 22, wherein information relating to an image attribute in an image region is stored in one or more vertices that represent the image region, whereby retrieval of said information is enabled by means of traversing the hierarchical graph representation in the computer model.

30. The method of claim 22, further comprising locating an image region which corresponds to a vertex in the computer model, wherein locating said information is enabled by means of traversing the hierarchical graph representation in the computer model.

31. The method of claim 22, further comprising searching an image region which corresponds to a vertex in the computer model.

* * * * *